(12) United States Patent
Elwell

(10) Patent No.: US 8,666,130 B2
(45) Date of Patent: Mar. 4, 2014

(54) SYSTEMS AND METHODS FOR BIO-IMAGE CALIBRATION

(75) Inventor: Sean Erich Elwell, Woodbury, CT (US)

(73) Assignee: Medical Image Mining Laboratories, LLC, Valhalla, NY (US)

( * ) Notice: Subject to any disclaimer, the term of this patent is extended or adjusted under 35 U.S.C. 154(b) by 309 days.

(21) Appl. No.: 13/042,976

(22) Filed: Mar. 8, 2011

(65) Prior Publication Data

US 2011/0216204 A1    Sep. 8, 2011

Related U.S. Application Data

(60) Provisional application No. 61/339,618, filed on Mar. 8, 2010.

(51) Int. Cl.
*G06K 9/00*    (2006.01)

(52) U.S. Cl.
USPC ......................................................... 382/128

(58) Field of Classification Search
USPC ......................................................... 382/128
See application file for complete search history.

(56) References Cited

U.S. PATENT DOCUMENTS

| 7,564,990 | B2 | 7/2009 | Kern et al. |
| 2003/0063300 | A1* | 4/2003 | Rubinstenn ............. 358/1.9 |
| 2005/0240366 | A1* | 10/2005 | Mestha et al. ............ 702/76 |
| 2007/0040907 | A1 | 2/2007 | Kern et al. |
| 2007/0053559 | A1 | 3/2007 | Corrion |
| 2011/0002511 | A1 | 1/2011 | Imaoka |
| 2011/0286643 | A1 | 11/2011 | Kislal |
| 2011/0286644 | A1 | 11/2011 | Kislal |

OTHER PUBLICATIONS

U.S. Patent and Trademark Office Non-Final Office Action in U.S. Appl. No. 12/833,064, Oct. 5, 2012, USA (15 pages).

* cited by examiner

*Primary Examiner* — Tom Y Lu
(74) *Attorney, Agent, or Firm* — Ference & Associates LLC

(57) ABSTRACT

Systems, methods, apparatuses and computer program products for bio-image calibration are described. One aspect provides a bio-image calibration device including: a calibration portion comprising predetermined color areas; wherein the predetermined color areas are arranged in a predetermined pattern corresponding to a watermark; wherein the predetermined color areas are a predetermined size and a predetermined shape; and wherein the predetermined color areas are located on one or more edges of the bio-image device. Other embodiments are described.

8 Claims, 5 Drawing Sheets

SYSTEMS AND METHODS FOR BIO-IMAGE CALIBRATION

CLAIM FOR PRIORITY

This application claims priority to U.S. Provisional Patent Application Ser. No. 61/339,618, entitled "SOM TOOL DEVICE AND METHOD FOR ACCURATELY CAPTURING, PROCESSING AND NORMALIZING IMAGES OF HUMAN SKIN", filed on Mar. 8, 2010, which is incorporated by reference.

BACKGROUND

Bio-imaging is important for a variety of reasons. Images of various conditions may find use in tracking, monitoring or managing a variety of concerns. For example, bio-imaging may provide useful insights for handling various disease conditions, addressing cosmetic concerns, and the like.

As an example of a health concern related to the condition of the skin, the most common type of cancer in the United States is skin cancer. Skin cancer often manifests itself as a mole that changes in appearance over time, often growing larger, changing in color, changing in shape, or changing in appearance in some way. Thus, use of imaging for accurate monitoring and tracking of changes in moles may prove useful in diagnosing, monitoring and managing skin cancer.

Bio-imaging may be leveraged in many other domains in addition to disease tracking, monitoring and managing. For example, images of skin, teeth or other areas of the body may be utilized to monitor, track and manage cosmetic procedures, or utilized in the selection of cosmetic products or treatments, and the like.

BRIEF SUMMARY

In summary, one aspect provides a bio-image calibration device comprising: a calibration portion comprising predetermined color areas; wherein the predetermined color areas are arranged in a predetermined pattern corresponding to a watermark; wherein the predetermined color areas are a predetermined size and a predetermined shape; and wherein the predetermined color areas are located on one or more edges of the bio-image device.

Another aspect provides a system comprising: a bio-image calibration device having a calibration portion comprising one or more predetermined color areas arranged in a predetermined pattern; and a computer program product comprising: a computer readable storage medium having computer readable program code embodied therewith, the computer readable program code comprising: computer readable program code configured to access an image comprising one or more conditions of a user and the calibration portion; computer readable program code configured to calibrate the image using the calibration portion; computer readable program code configured to analyze the one or more conditions represented by the image; and computer readable program code configured to output one or more results corresponding to the one or more conditions of the image.

A further aspect provides a computer program product comprising: a computer readable storage medium having computer readable program code embodied therewith, the computer readable program code comprising: computer readable program code configured to provide a bio-image calibration device in electronic form, the bio-image calibration device comprising a calibration portion comprising predetermined color areas; wherein the predetermined color areas are arranged in a predetermined pattern corresponding to a watermark; wherein the predetermined color areas are of a predetermined size and a predetermined shape; and wherein the predetermined color areas are located on one or more edges of the bio-image device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
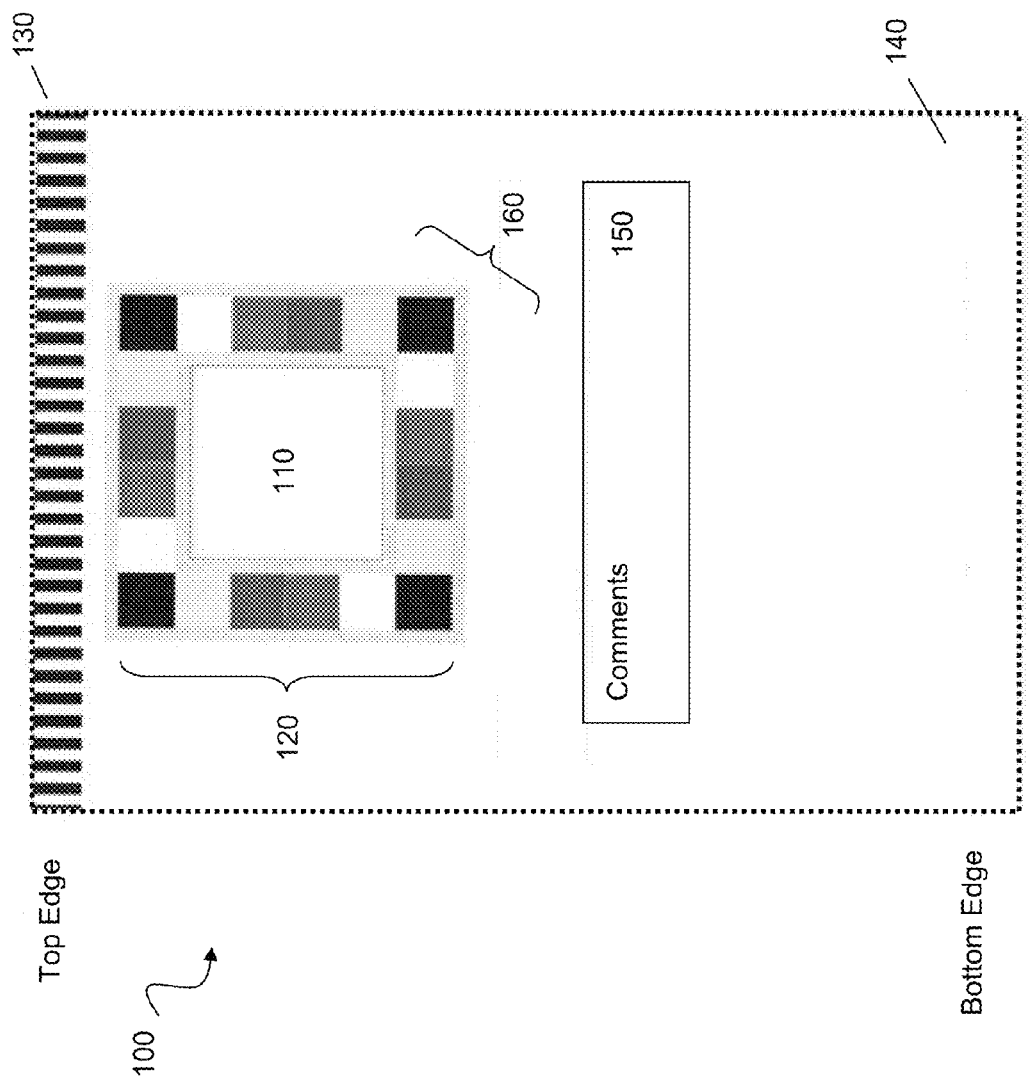
FIG. 1 illustrates an example bio-image calibration device.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the claims, but is merely representative of those embodiments.

Reference throughout this specification to "embodiment(s)" (or the like) means that a particular feature, structure, or characteristic described in connection with the embodiment is included in at least one embodiment. Thus, appearances of the phrases "according to embodiments" or "an embodiment" (or the like) in various places throughout this specification are not necessarily all referring to the same embodiment.

Furthermore, the described features, structures, or characteristics may be combined in any suitable manner in different embodiments. In the following description, numerous specific details are provided to give a thorough understanding of example embodiments. One skilled in the relevant art will recognize, however, that aspects can be practiced without certain specific details, or with other methods, components, materials, et cetera. In other instances, well-known structures, materials, or operations are not shown or described in detail to avoid obfuscation.

Taking skin cancer as a representative example, it can be important to recognize differences between a normal skin condition (for example, a normal mole) and one that is indicative of a problem (for example, an abnormal mole). While health care professionals can often readily identify abnormal moles, one key factor in recognizing an abnormal skin condition, such as skin cancer, is detecting changes in the skin condition, such as changes in shape, size and/or color of a mole over time, as normal moles are typically stable in shape, size, color and/or border/boundary features. Much the same is applicable for other conditions, such as other skin conditions like wrinkles, or with cosmetic conditions such as the color of teeth.

Thus, patients, health care professionals, and others are often faced with the challenge of keeping an eye on conditions in order to track any changes that take place. The inventor has recognized that it can be difficult to recognize changes in conditions. This can result from many factors, such as a large number of moles, delay between patient visits, and the like. Thus, screening for changes in conditions can be difficult. Accordingly, the inventor has recognized a need for providing an effective, easy monitoring of such conditions.

Systems, methods, apparatuses and program products configured to provide convenient monitoring and analysis of conditions are described in co-pending and commonly owned U.S. patent application Ser. No. 12/833,064,filed on Jul. 9, 2010, entitled "SYSTEMS AND METHODS FOR MONITORING THE CONDITION OF THE SKIN", which is incorporated by reference here. In such a system, an image (such as a digital photograph or image of a mole), may be provided as input. The image is then analyzed to identify characteristics of the condition, as represented by the image.

Providing high quality images can be challenging. For example, if patients or health care providers take images that differ in some way, for example lighting condition, angle of image capture, scaling/dimensions of the image, and the like, it can prove difficult to properly normalize the images for monitoring, tracking and/or managing the conditions via comparison of the images.

Accordingly, an embodiment provides a system to assist in the capture of images such that the images contain all of the necessary information to automatically normalize, orient, color correct, process, archive and/or utilize the images to detect important characteristics related to a condition of interest. These characteristics may include, but are not necessarily limited to, signs of melanoma, signs of aging, signs of dermatological disease, signs of other diseases, signs of progress or lack thereof as a result of a cosmetic treatment, and/or characteristics enabling more accurate prescription of cosmetic products, beauty products or healthcare products.

An embodiment provides a bio-image calibration device to assist with the proper capture and calibration of images to detect important characteristics related to a condition of interest. The calibration device assists with the task of accurately documenting and analyzing conditions, such as human skin moles, for the purpose of detecting an indication of change in the conditions, such as an indication of the malignant skin cancer melanoma. However, as described herein, the calibration device may additionally be utilized to assist with the detection other forms of skin cancer, skin aging (for example wrinkles), generalized sun damage, tooth color/whiteness, and the like. Such a calibration device may also be utilized for purely cosmetic purposes, such as to assist a consumer with the selection of appropriate cosmetic products and/or procedures. Thus, the calibration device assists in image correction and calibration of any anatomical feature or condition. The calibration device helps to improve image capture and documentation in other non-anatomical contexts as well.

As an example, images of human skin conditions/features (for example, moles) may benefit from color normalization and improvements to various aspects of documentation. Archived images without such normalization and improvements may not consistently document dimension, color, lighting condition, camera angle and the like. By capturing images of the moles or other conditions along with a calibration device, each of these deficiencies may be resolved. Thus, an improved database of archived images is achievable, with improved potential to derive meaningful and useful information from the images. Specifically, higher quality images with proper documentation improves the ability to accurately detect indications of change in many conditions, such as changes in skin conditions (for example moles indicative of melanoma development).

The description now turns to the figures. The illustrated example embodiments will be best understood by reference to the figures. The following description is intended only by way of example and simply illustrates certain example embodiments representative of the invention, as claimed.

Referring to FIG. 1, an example bio-image calibration device is illustrated. The calibration device 100 assists with the proper capture and calibration of images. The calibration device 100 may be particularly advantageous when capturing images pertaining to anatomical features, such as features of the human skin. For example, the calibration device 100 assists with the task of accurately documenting and analyzing human skin moles for the purpose of detecting visible indications of the malignant skin cancer, melanoma.

In an embodiment, the calibration device 100 includes some or all of the following features: a dimension calibration capability, a color calibration capability, an image watermark generation capability, an image orientation capability, a location capability, and a camera angle correction capability.

The dimension calibration capability provides for utilization of one of many conceivable size calibration methods. In an embodiment, the dimension calibration capability consists of a "window" 110 of known size through which the condition (for example, a skin mole) may be viewed. Squares 120 (or similar known shape(s), which may be color-coded, as described further herein) of known dimension are printed along the inside edge or edges of the window 110. The squares 120 may be used to assist with size measurements.

Measurements of features seen within the window 110 may be deduced via mathematical equations, deductive logic and/or simple size comparison. For instance, if the window 110 is 20 mm wide and the feature width spans half the distance of the window 110 opening, the feature must be 10 mm wide. If color-coded, each color block is of known dimension (for example, each may be a 5 mm square). Thus, if a feature (such as a mole) is wider across than one square, it is more than 5 mm along that axis. Alternatively, the dimension calibration capability may consist of a "ruler" 130 that lies beside, under or above the skin feature to be measured. In an embodiment, the calibration device illustrated includes both a window 110 measurement feature and an additional ruler 130 along the top edge. By including both the window 110 and a top ruler 130, the device may work on both large and small skin features alike.

An embodiment includes a color calibration capability to correct for various lighting conditions, to enable precise documentation of the condition, as well as calibration of color itself. In some fields of work, such as film or videography, such a capability is referred to as using a "white balancing" method. A CMYK color calibration method may also be utilized, as discussed in the following paragraph. In an embodiment, the calibration device 100 includes a border of blocks 120 of know dimension (such as 5 mm×5 mm square) having know colors. As an example, the following colors may be utilized in a pattern: black, white, cyan, magenta and yellow. The pattern may be repeated, such as around the window 110. Each of the colors (cyan, magenta, yellow, black and white) may be accurately rendered on the calibration device 100, such as by being printed using known color values.

Upon capturing a digital image, for example of a human subject, with the aid of such a calibration device 100, a software analytic program may then search the image for the color blocks 120 surrounding the captured image of the desired skin feature. By correcting the images to the known color values of the color blocks 120, each of the images may then be normalized. This color calibration feature in tandem with a software analytic program or algorithm can correct the images for various lighting conditions. The color calibrator feature may utilize any or all of a number of systems for achieving color calibration including a red, green, blue system and/or pure white. Cyan, Magenta, Yellow, and Black (CMYK) may be optimal for color calibration of certain conditions, such as moles, or where white balancing is not optimal due to paper whiteness variations.

An embodiment includes an image watermark generation capability to effectively label or "brand" the captured images. Thus, the calibration device 100 may include a watermark. For example, the color blocks 120 bordering the window 110 of the example calibration device 100 illustrated in FIG. 1 may serve a dual purpose in also providing image watermarking The watermark may be used to uniquely identify image(s) for a particular company, user, organization, and the like, which may assist in archiving the images.

The sequence of colors within the color blocks 120 may be a predetermined, unique sequence assigned to the calibration device. If so, the presence of a uniquely arranged color blocks 120 border in the image is therefore a watermark that the image is a proprietary image captured using the calibration device 100, and may be used in identifying and archiving the image.

An embodiment includes an image orientation capability. Proper use of the calibration device 100 will create a record of the axial orientation of the visibly documented skin feature (s). In an embodiment, the calibration device 100 produces images captured with a handle 140 pointing in a known orientation (for example, toward the ground/floor assuming the user is standing with arms by her side). If the user chooses to capture the same skin feature at a later date, the orientation feature assists the user in observing accurate "before and after" comparisons with regard to orientation. An embodiment of the calibration device 100 may document the orientation by the position of the watermark (for example, position of the color blocks 120). In this case, the side of the image with the unique sequence of colors nearest the bottom edge of the image may be assumed to be toward the feet of the user. The unique sequence of colors 120 along the bottom edge allows the user and the software to identify the bottom edge of the image and therefore record the image orientation.

An embodiment includes a location capability. The calibration device 100 includes an area 150 in which the user can notate the location where the image was captured, and/or provide other information, as desired. In an embodiment, such notations are done manually with a pen or other writing utensil and captured along with the dermatological feature within image, and this image may be stored in a database. For example, by knowing where a skin feature such as a mole is located on the body the user can return to that location at a future date to re-capture the skin feature in subsequent images. Location may be important to observing and documenting change over time.

An embodiment includes a camera angle correction capability. For example, an embodiment includes one or more predetermined shapes of known dimension, such as a pattern of squares 160. By including a pattern of 5 mm×5 mm squares 160 around the image capture zone (window 110), the user can measure the observed "keystone effect." "Keystone effect" is an optical effect whereby a perfect square or rectangle appears trapezoidal when observed from an angle; the more extreme the observed trapezoid the greater the angle. The "keystone effect" may be used to deduce the camera angle at the time of image capture. Once the camera angle is determined, the angle may be corrected as needed to permit accurate and normalized image comparisons. For example, by knowing the change in camera angle between images, the observed images can be automatically normalized in software for comparison purposes.

Figure 2:
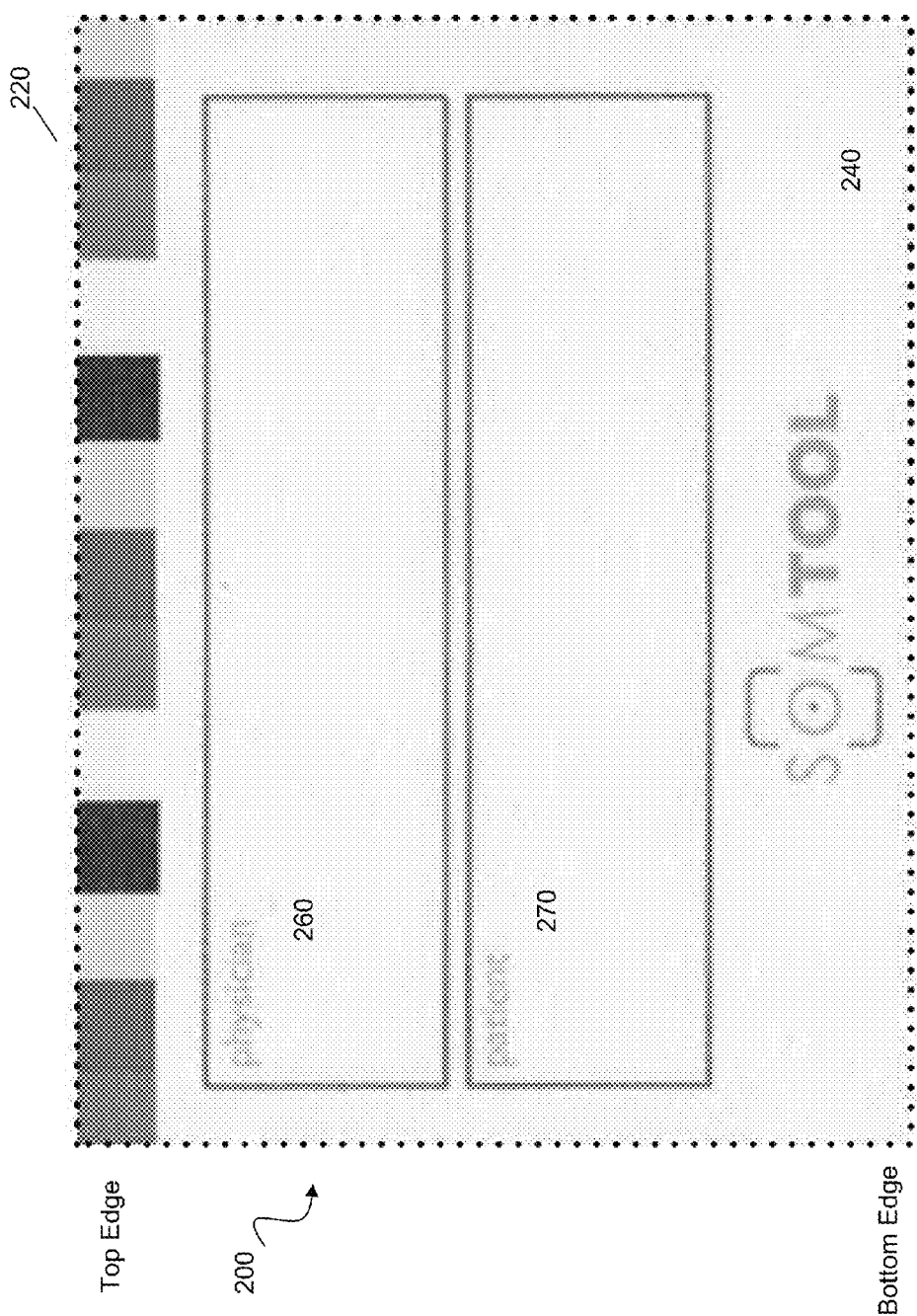
FIG. 2 illustrates an example bio-image calibration device.

FIG. 2 illustrates an example bio-image calibration device. In this example, the color blocks 220 are located along a top edge of the calibration device 200. The color blocks are positioned for example below the feature, such as a skin mole, to be captured in an image. Calibration device 200 further includes identification areas 260, 270 for identifying physician and patient, respectively. For example, a user may write in the names of the physician and patient in areas 260, 270 prior to image capture. The calibration device 200 likewise contains a top edge and bottom edge, with indications of orientation, such as handle 240 that can be positioned consistently (for example, towards the ground) for consistent orientation determination. Moreover, calibration device 200 includes watermark generating capability, and dimension and color calibration capabilities, by virtue of a predetermined pattern of color blocks 120.

Figure 3:
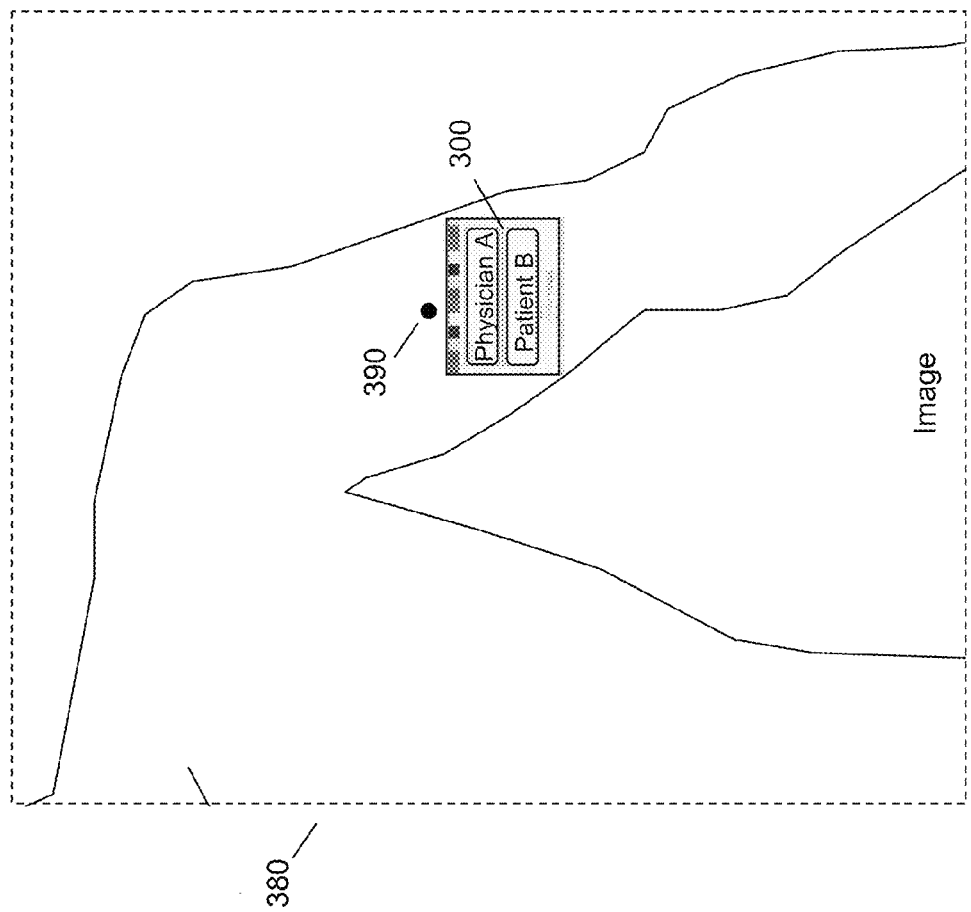
FIG. 3 illustrates an example bio-image.

Referring to FIG. 3, an example image of an example skin condition is illustrated. It should be noted that the size of the calibration device 300, the condition illustrated, the positioning of the user, the angel of the camera, the scope of the image, et cetera are merely used as a representative example.

Here, the calibration device 300 is included in the image 380, such as a digital image captured in a doctor's office visit. The image includes a condition of interest such as a mole 390 appearing on a patient's upper left arm. As illustrated, the calibration device, having features of known size, color and orientation, et cetera, as described herein, allows for accurate capturing of information related to the mole. Thus, the image 380 contains all information needed for accurate comparison with other images. For example, the inclusion of the calibration device imparts context to the image with regard to dimension, color, lighting, angle, orientation, watermarking, location, identification and the like, such that the image can be analyzed by software and normalized to other images contained within a database.

Figure 4:
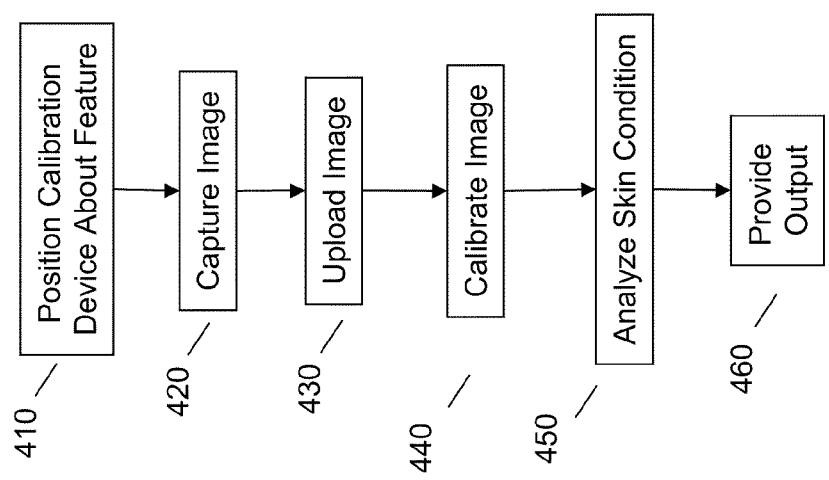
FIG. 4 illustrates an example of bio-image calibration.

Referring to FIG. 4, an example of image calibration is illustrated. A user positions the calibration device appropriately about the feature/condition of interest at 410. For example, the user may stand with feet on the ground and arms oriented toward the ground, and position the calibration device about a mole appearing on the skin. The calibration device may be fashioned out of a suitable material, such as plastic or paper. For example, if the calibration device is paper-based, it may be provided as an electronic document (such as a PDF document) on a web site and printed out by a user for home use (using appropriate printing properties regarding size and/or color). The calibration device may be fixed into position using a suitable fastener (such as clear tape) or simply held in position by the user or another user.

The user then captures an image of the feature and the calibration device (or part thereof) at 420. Inclusion of the calibration device or part of the calibration device allows for accurate calibration of the image, facilitating accurate comparison with other images, as described herein. If the user captures a digital image, for example, the user may simply upload the image to a computing device, which may be utilized for the analysis. Alternatively, the user may transmit the image (such as over the Internet) to another device for analysis.

At 440, the image is calibrated as described herein. For example, the dimensions of the feature may be calibrated based on the known dimensions of features included in the calibration device. The color/lighting of the feature may be calibrated based on the known colors of features included in the calibration device. The camera angle may be calibrated based on the known dimensions of features included in the calibration device. The orientation of the feature may be calibrated based on the known orientation of features included in the calibration device. The image may be identified based on known features included in the calibration device.

Each of these calibration steps, or a suitable combination thereof, may be performed automatically by one or more software image analysis techniques. For example, each pixel of a digital image contains information such as color level/intensity which may be utilized to establish where the color blocks of the calibration device appear in the image for use in color calibration, dimension calibration, orientation calibration, watermarking and the like. In the context of a color block, this may include pixel-by-pixel identification of a color block, followed by the analysis of pixels within the color block to ascertain color content, intensity/level, color consistency, et cetera. Other aspects of the image may be similarly analyzed to automatically ascertain features included in the digital image.

Similarly, at 450 the skin condition is analyzed. This may include for example determining the dimensions, color, orientation, location, et cetera of the feature, such as a mole. In the context of a mole, this may include pixel-by-pixel identification of a border of the mole, followed by the analysis of pixels within the border to ascertain color content, intensity/level, color consistency, et cetera. More information on analysis of skin conditions may be found in co-pending and commonly owned U.S. patent application Ser. No. 12/833,064. The analysis may include comparison with other calibrated images for computation of change in the feature, such as change in mole color or size, or comparison with other similar images, such as comparison of the feature with other know features (for example, comparison of a mole with known melanoma lesions).

Following the image analysis, output is provided at 460. This output may be in a variety of forms. For example, change scores may be computed (such as a percent increase in size since a prior image capture), similarity scores may be computed (such as percent similarity with known disease conditions), and the like. The scores may be normalized in some way, such as provisioning of a scaled (1-10) score.

A user may perform the example steps of FIG. 4 using an online tool provided as a service over the Internet, or the service may be downloaded to a local machine and performed locally, or some suitable combination of the forgoing. For example, an individual can capture images of a feature of interest (such as a mole, the whiteness of teeth, the amount of wrinkles, et cetera) before and after undergoing a treatment in order to test the efficacy of the treatment. If the treatment was effective, the scores reported should decrease and/or the best match reference image(s) should have an improved appearance as compared with than a previous best match. Thus, a user may utilize the calibration device to conveniently track home treatment of a tooth whitening product, a doctor may utilize the calibration device in his or her office to conveniently monitor, track and manage a patient's moles, and the like.

Figure 5:
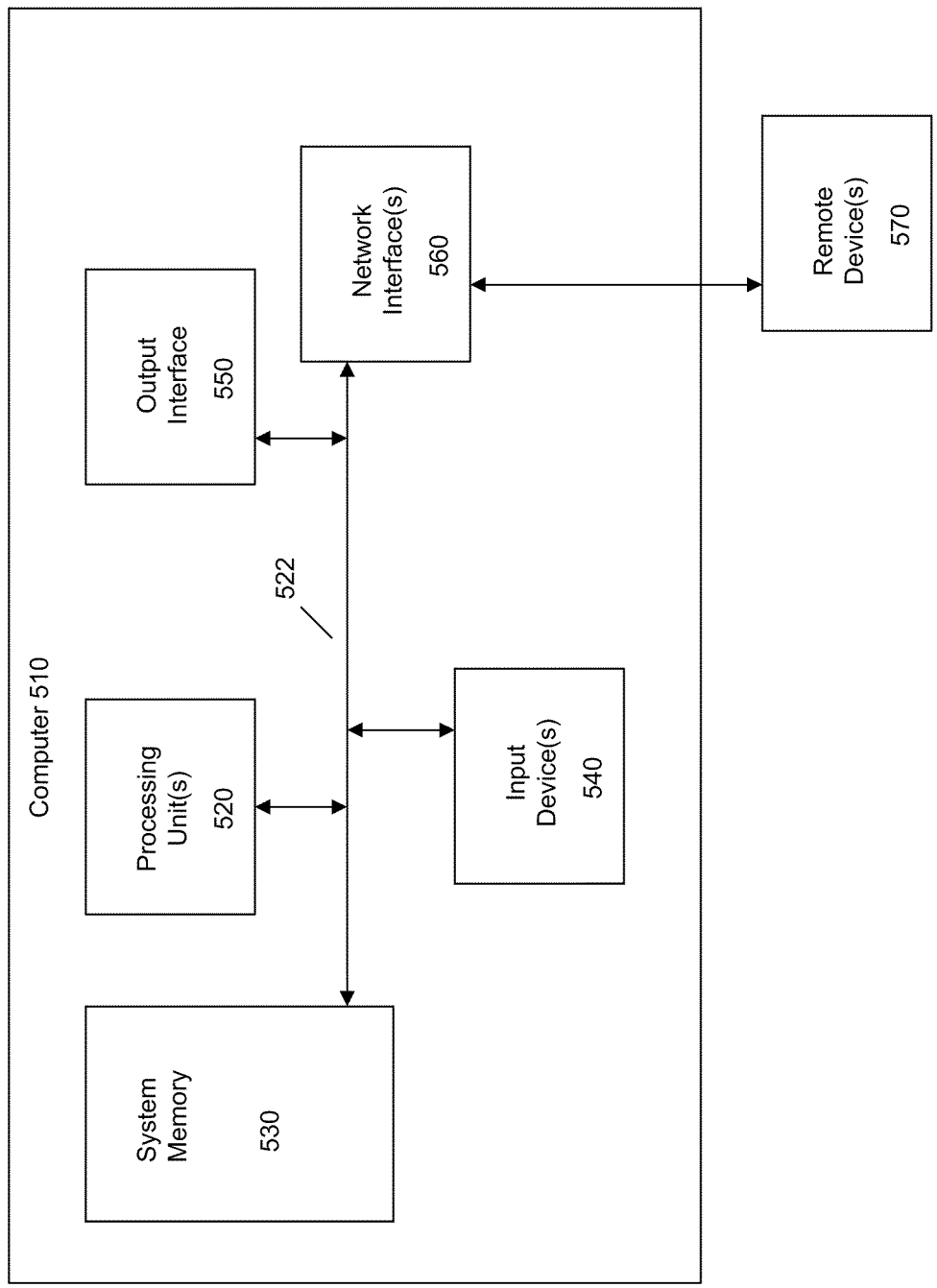
FIG. 5 illustrates an example computing device.

Referring to FIG. 5, it will be readily understood that certain embodiments can be implemented using any of a wide variety of devices or combinations of devices. An example device that may be used in implementing embodiments includes a computing device in the form of a computer 510, though other devices such as tablet devices, smart phones and the like are equally applicable. In this regard, the computer 510 may execute program instructions configured to provide automatic calibration of bio-images and analysis of conditions, such as conditions of the skin, and perform other functionality of the embodiments, as described herein.

Components of computer 510 may include, but are not limited to, at least one processing unit 520, a system memory 530, and a system bus 522 that couples various system components including the system memory 530 to the processing unit(s) 520. The computer 510 may include or have access to a variety of computer readable media. The system memory 530 may include computer readable storage media in the form of volatile and/or nonvolatile memory such as read only memory (ROM) and/or random access memory (RAM). By way of example, and not limitation, system memory 530 may also include an operating system, application programs, other program modules, and program data.

A user can interface with (for example, enter commands and information) the computer 510 through input devices 540. A monitor or other type of device can also be connected to the system bus 522 via an interface, such as an output interface 550. In addition to a monitor, computers may also include other peripheral output devices. The computer 510 may operate in a networked or distributed environment using logical connections (network interface 560) to other remote computers or databases (remote device(s) 570). The logical connections may include a network, such local area network (LAN) or a wide area network (WAN), but may also include other networks/buses.

It should be noted as well that certain embodiments may be implemented as a system, method or computer program product. Accordingly, aspects may take the form of an entirely hardware embodiment, an entirely software embodiment (including firmware, resident software, micro-code, et cetera) or an embodiment combining software and hardware aspects that may all generally be referred to herein as a "circuit," "module" or "system." Furthermore, aspects may take the form of a computer program product embodied in computer readable medium(s) having computer readable program code embodied therewith.

Any combination of computer readable medium(s) may be utilized. The computer readable medium may be a non-signal computer readable medium, referred to herein as a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a computer readable medium may be transmitted using any appropriate medium, including but not limited to wireless, wireline, optical fiber cable, RF, et cetera, or any suitable combination of the foregoing.

Computer program code for carrying out operations for various aspects may be written in any programming language or combinations thereof The program code may execute entirely on a single computer (device), partly on a single computer, as a stand-alone software package, partly on single computer and partly on a remote computer or entirely on a remote computer or server. In some scenarios, the remote computer may be connected to another computer through any type of network, including a local area network (LAN) or a wide area network (WAN), or the connection may be made for example through the Internet using an Internet Service Provider.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer, or other programmable apparatus, provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Although illustrated example embodiments have been described herein with reference to the accompanying drawings, it is to be understood that embodiments are not limited to those precise example embodiments, and that various other changes and modifications may be affected therein by one skilled in the art without departing from the scope or spirit of the disclosure.

The invention claimed is:

1. A bio-image calibration device comprising:
   a calibration portion comprising predetermined color areas;
   wherein the predetermined color areas are arranged in a predetermined pattern corresponding to a watermark;
   wherein the predetermined color areas are a predetermined size and a predetermined shape; and
   wherein the predetermined color areas are located on one or more edges of the bio-image device.

2. The bio-image calibration device according to claim 1, wherein said one or more edges comprise one or more of a top edge and a bottom edge of the bio-image calibration device.

3. The bio-image calibration device according to claim 1, further comprising an aperture in the bio-image calibration device; wherein said aperture is at least partially lined with the predetermined color areas.

4. The bio-image calibration device according to claim 1, wherein the predetermined color areas are printed on the bio-image calibration device using known color values for the following colors: cyan, magenta, yellow, and black;
   wherein a color area of the predetermined color areas contains a single color selected from the group of colors consisting of cyan, magenta, yellow and black.

5. The bio-image calibration device according to claim 1, further comprising one or more portions for labeling positioned outside of the predetermined color areas.

6. The bio-image calibration device according to claim 1, further comprising a handle positioned outside of the predetermined color areas.

7. The bio-image calibration device according to claim 1, wherein said bio-image calibration device is paper-based.

8. The bio-image calibration device according to claim 1, wherein the watermark is configured to uniquely identify one or more of a company, a user, and an organization.

* * * * *